US012442359B2

(12) United States Patent
Kjersem

(10) Patent No.: US 12,442,359 B2
(45) Date of Patent: Oct. 14, 2025

(54) WINDMILL CONSTRUCTION AND A METHOD FOR ASSEMBLY OF A WINDMILL CONSTRUCTION

(71) Applicant: TEBINA ENERGI AS, Bergen (NO)

(72) Inventor: Geir Lasse Kjersem, Bergen (NO)

(73) Assignee: TEBINA ENERGI AS, Bergen (NO)

( * ) Notice: Subject to any disclaimer, the term of this patent is extended or adjusted under 35 U.S.C. 154(b) by 0 days.

(21) Appl. No.: 18/838,523

(22) PCT Filed: Feb. 16, 2023

(86) PCT No.: PCT/NO2023/050036
§ 371 (c)(1),
(2) Date: Aug. 14, 2024

(87) PCT Pub. No.: WO2023/158319
PCT Pub. Date: Aug. 24, 2023

(65) Prior Publication Data
US 2025/0154932 A1 May 15, 2025

(30) Foreign Application Priority Data
Feb. 16, 2022 (NO) .................................. 20220210

(51) Int. Cl.
*F03D 13/20* (2016.01)
*B66C 23/18* (2006.01)
(Continued)

(52) U.S. Cl.
CPC ............ *F03D 13/206* (2023.08); *B66C 23/18* (2013.01); *E02D 27/425* (2013.01);
(Continued)

(58) Field of Classification Search
CPC .... F03D 13/112; F03D 13/126; F03D 13/206; E04H 12/344
See application file for complete search history.

(56) References Cited

U.S. PATENT DOCUMENTS 11,053,103 B2 * 7/2021 Strandberg ............ B66C 23/207
12,188,452 B2 * 1/2025 Osorio Martinez .... E04H 12/08
(Continued)

FOREIGN PATENT DOCUMENTS

| JP | 2001254668 A | 9/2001 |
| WO | 2011055021 A2 | 5/2011 |
| WO | 2021141534 A1 | 7/2021 |

OTHER PUBLICATIONS

WIPO/ISA/EPO International Search Report issued in International Application No. PCT/NO2023/050036 on Jun. 19, 2023, 5 pages.
(Continued)

*Primary Examiner* — Danielle M. Christensen
(74) *Attorney, Agent, or Firm* — J. Peter Paredes; Amin Wasserman Gurnani LLP

(57) ABSTRACT

A windmill construction (10), comprising a rotor-nacelle assembly (12) with blades (14), a tower (16), a substructure (20) and a foundation (22). The substructure (20) comprises a first guide collar (24) and a second guide collar (26) for support of the tower (16), said first guide collar (24) being located in a lower part of the substructure (20) and said second guide collar (26) being located in an upper part of the substructure (20). The substructure (20) comprises a jack-up assembly (30) for receipt of modular tower segments (18), said tower segments (18) are arranged to be assembled in the substructure (20) and erectable by the jack-up assembly (30) to produce an assembled tower (16). The invention is also directed to a method for assembly of a windmill construction.

28 Claims, 11 Drawing Sheets

(51) Int. Cl.
  *E02D 27/42* (2006.01)
  *E04H 12/34* (2006.01)
  *F03D 13/10* (2016.01)
  *E02B 17/00* (2006.01)

(52) U.S. Cl.
  CPC ......... *E04H 12/344* (2013.01); *F03D 13/112* (2023.08); *F03D 13/126* (2023.08); *E02B 2017/0091* (2013.01); *F05B 2230/61* (2013.01); *F05B 2240/912* (2013.01); *F05B 2240/95* (2013.01)

(56) References Cited

U.S. PATENT DOCUMENTS

| | | |
|---|---|---|
| 2010/0189531 A1 | 7/2010 | Christensen |
| 2011/0239584 A1 | 10/2011 | Tuong et al. |
| 2023/0160366 A1* | 5/2023 | Baun .................. F03D 13/20 52/173.1 |

OTHER PUBLICATIONS

Norwegian Intellectual Property Office, Norwegian Search Report issued in corresponding Norwegian Patent Application No. 20220210 on Sep. 16, 2022, 2 pages.

* cited by examiner

WINDMILL CONSTRUCTION AND A METHOD FOR ASSEMBLY OF A WINDMILL CONSTRUCTION

CROSS-REFERENCE TO RELATED APPLICATIONS

The present application claims priority to PCT application serial no. PCT/NO2023/050036, filed Feb. 16, 2023, which claims priority to Norwegian patent application No. 20220210, filed Feb. 16, 2022, each herein incorporated by reference in their entireties.

FIELD OF THE INVENTION

The present invention relates to a windmill construction and a method for assembly of a windmill construction. The windmill construction comprises a rotor-nacelle assembly with blades, a tower, a substructure and a foundation.

BACKGROUND OF THE INVENTION

The increasing size of wind turbines and the need to reduce both investment and operations cost, as well as exploiting wind resources more efficiently-both on land and at offshore sites are introducing new challenges for the wind industry.

So-called monopile support structures introduce problems in terms of manufacturing, installation and sensitiveness towards soil structure interaction. The increasing heights of such structures increases investment cost and complicates access to nacelles,—where mobilization of expensive mobile cranes, either floating units at sea or wheeled vehicles on land, will be required for maintenance and inspection.

An alternative solution is represented by the hybrid jacket tower concept, consisting of a space-frame substructure supporting a tubular tower. A further alternative solution is a lattice support structure. These have some attractive features, but with the heavy and complex nacelle located high above the ground or sea level, the maintenance access to the nacelle for maintenance will be as complex as for the monotower solutions.

Taller towers can tap stronger wind resources that exist at higher levels, beyond the reach of today's typical turbines. Higher hubs on wind turbines also reduce interference from trees, buildings, and other topographical features and provide additional clearance needed for longer blades, all of which increases energy capture per turbine.

Size increases have led to greater output from turbines under ideal conditions, also known as the nameplate capacity, which has gone from 100 KW per turbine in the 1980s to approximately 2.2 MW per turbine in 2017. In that same time frame, the average U.S commercial wind turbines hub height increased from 20 m to 84 m and rotor diameter has expanded from 20 m to 108 m.

Key technology attributes enabling cost reductions realized to date include advancements that have resulted in the capture of turbine, balance of station (BOS), and operation and maintenance (O&M) economies of scale as well as increased energy production per turbine and per unit of installed capacity. More specifically, increased energy production has been realized with taller towers that place turbines into higher-quality resource regimes as well as larger rotors that enable more of the wind passing by the turbine to be converted into electricity.

However, the taller the windmill construction get, the harder the windmill constructions will be to repair and maintain. Wind turbines occasionally need big parts, blades or generators, replaced. That is challenging on land, but on land a crane can be supported by the ground.

Floating windmill constructions will however operate in water often too deep for jackup vessels to work, so the service vessel must be remaining floating and thus having two moving structures to shift load from and to. This is technically demanding and thus hard to do in a cost-effective way.

Hence, a challenge today by going taller is increased investments and cost, and possible loss of income due to difficult maintenance and downtime.

A challenge is also the amount of weight of the steel used in a large monotower windmill construction. For instance, a tall monopile construction will require a big and heavy foundation pile to penetrate the ground (on land)—or the seabed (at sea). The diameter of such holes may be 6-8 meter in diameter and will require expensive soil preparations prior to installing the large monotower foundation pile and securing it to the soil, which is far more expensive than preparing the foundation based on a number of small diameter piles with conventional sizes and moderate weights enabling the use of traditional construction and support equipment A monopile construction at sea is also subject to higher hydrodynamic forces compared to a lattice type jacket structure, given the same topsides loads.

A lattice type jacket structure at sea is attractive to minimize environmental forces from waves, sea currents and wind. However, when a monopile structure is installed onto the top of such a lattice type jacket structure, as is the common technology today, a larger transition piece is required on top of the jacket structure, giving, together with a heavier substructure, a rather large total mass. In addition, when a monopile is installed onto the top of a preinstalled lattice type jacket structure at sea, an expensive heavy lift barge will be required to lift and support the installation of both the monotower structure and subsequently, the nacelle.

Jacket substructures/foundations are classically three- or four-legged triangulated structures all made of circular steel tubes. On top of the jacket structure is installed a transition piece, typically a plated structure, which is designed with a large center steel tube for connection with the tower. The jacket is typically anchored into the seabed by piles installed at each jacket leg.

Lattice towers are typically manufactured by means of welded or bolted tubular steel profiles or L-section steel profiles. The lattice towers are typically three-four-legged and consist of corner chords interconnected with bracings in a triangulated structure.

OBJECTS OF THE PRESENT INVENTION

It is an object to address at least some of the above drawbacks.

It is an object of the invention to be able to build higher windmill constructions to reach higher altitudes where wind resources are more stable and will give a higher capacity factor for the wind mill,—and hence better economics—without compromising the access to the nacelle for maintenance and repair.

It is also an object of the present invention is to utilize as best as possible the capacity of the steel used, particularly in a substructure of the windmill construction, both during assembly and during operation.

A further object is rendering use of mobile cranes superfluous for both construction and maintenance support, both on land and at sea.

It is also an object to provide onshore and offshore windmill constructions, which are environmentally friendly.

In medium sea water depth, regarding marine environment impact, the present invention may possibly present the following advantages. The substructure of the windmill construction according to the invention can be designed as a lattice structure and installed onto the seabed in moderate water depths, e.g. down to 100-150 meters water depth, like traditional offshore steel jackets and piled to the seabed. From an environmental perspective will lead to a small or moderate occupation of seabed area. Sea water will be free flowing, and the sea volume entrapped by the substructure could function as protected habitat for marine life.

In ultra-deep-water installation, regarding marine environment impact, the present invention may possibly present the following advantages. The substructure of the windmill construction according to the invention may also be installed onto a floater designed for deep water installation, e.g. in water depths down to 2,000 meters, using technologies well known from the offshore industries. Such a floater may e.g. be a semisubmersible design, as illustrated in FIG. 7 of the present application, or a SPAR buoy type floater, being catenary moored to the seabed. Alternatively, the floater may be designed as a tension leg platform (TLP) or a SPAR buoy with TLP mooring. From a marine environmental perspective, the TLP mooring has an advantage by occupying small areas of the seabed compared to the vast seabed areas occupied by catenary moorings.

Regarding foundation effects from substructure installed in shallow marine environment, the present invention may possibly present the following advantages. The substructure of the windmill construction according to the invention can be founded to the ground, or to a seabed, by using a number of moderately sized piles, driven into the ground taking advantage of well-known piling techniques. This allows the substructure of the invention to be installed or erected in most types of soils and terrain topographies. Compared to local blasting this foundation method has minimum local environmental impact compared to e.g. need for blasting or drilling huge holes to accommodate large monotower structures. These environmental aspects are especially important in shallow and sensitive sea water locations being breeding grounds for marine life.

The present invention may have a positive impact on local shallow water environment. The substructure of the windmill construction according to the present invention may be installed or erected in in ultra-shallow waters, both in benign and harsh environments where water at times will be breaking the reefs, i.e. areas were water depths may vary from −20 meters to +5 meters relative to sea level. These marine environments are often habitats fish and are also their breeding grounds. These splash zone areas are often located far from populated areas and therefore attractive to energy installations such as wind farms which does not inflict lasting damage to the marine life, as will the case with the present invention. A lattice structure of the substructure may become protective habitats for marine life and be fitted with small artificial reef structures which may improve hiding and breeding areas for local fish underneath the lower deck. The working deck areas of the substructure may also be vacant during remote operations of the wind turbines, allowing accommodation of research activities on the local wild life.

Wind turbines emits noise which affects the local environment. For reducing noise impact on the environment, both on land and at sea, by for instance insulation, the present invention may possibly present the following advantages. Compared to short term ship traffic, long term and almost continuous wind turbine noise, being transmitted to the seabed via the tower and support structures, may over time have negative impact on local marine life. The design of the substructure of the windmill construction according to the invention can be tailored/designed to significantly reduce or eliminate such structurally transmitted to the environment. This is obtained by implementing commercially available, flexible, sound absorbing material to the guide systems, such as stiff rubber, etc. By introducing also sound absorbing material to the bottom mast support and guide system, as illustrated in FIGS. 11-15 of the present application, most of the noise transmitted from the wind turbines via the tower structure towards the seabed (or local land soil) environment, can be removed by the windmill construction according to the present invention.

For reducing noise and environmental impact, by for instance taller towers, the present invention may possibly present the following advantages. A feature of the present invention is that the wind turbines may be economically installed at taller heights than being possible today, e.g. up to 250-300 meters. Such an increased height will be positive for the local ground or seabed environment, due to increased distance from noise source. In addition, the local bird life will take advantages of less risk for birds colliding with the rotating turbine blades.

In building the windmill construction and the tower, guy lines pre-tensioning the tower can be used, and which follows the tower during building. Such guy lines may improve buckling length of the tower and could possibly also reduce the total weight of the tower structure.

SUMMARY OF THE INVENTION

According to a first aspect of the invention, a self-elevating windmill construction is provided, comprising a rotor-nacelle assembly with blades, a tower, a substructure and a foundation. The substructure comprises a first guide collar and a second guide collar for support of the tower, said first guide collar being located in a lower part of the substructure and said second guide collar being located in an upper part of the substructure. The substructure further comprises a jack-up assembly for receipt of modular tower segments, said tower segments are arranged to be assembled in the substructure and are erectable by the jack-up assembly to produce an assembled tower.

Alternative embodiments are disclosed in the dependent product claims.

The first guide collar and the second guide collar have each an aperture allowing through going axial movement of the tower segments.

The first guide collar and the second guide collar can be closable and openable.

The first guide collar and the second guide collar may further comprise elastic dampers.

The substructure may possibly comprise a third guide collar located between the first guide collar and the second guide collar, wherein the third guide collar has a closable and openable aperture allowing through going axial movement of the tower segments.

The third guide collar can also comprise an elastic damper.

The substructure can be a lattice structure.

The substructure and the foundation can be integrated with each other.

Each tower segment can be a tubular pipe section or a lattice section.

Each tower segment comprises flanges for attachment to abutting tower segments.

The tower segment can be a tubular section equipped with vertical guide rails for connection to the jack-up assembly.

The jack-up assembly can in one embodiment comprise hydraulic pressure cylinders attachable to the tower segment, said hydraulic pressure cylinders comprise lower and upper claws for gripping and locking onto T shaped vertical guide rails on the tower segment, and wherein the hydraulic pressure cylinders are activatable to force the tower segments upwards during assembly of the tower.

The jack-up assembly can in another embodiment comprise a rack and pinion system, said rack and pinion system being activatable to force the tower segments upwards during assembly of the tower.

The jack-up assembly can in a further embodiment comprise a winch system connected to a support platform, said winch system being activatable to force the platform and the tower segments upwards during assembly of the tower.

The tower and/or the tower segments can comprise attachment lugs for guy lines.

The jack-up assembly can be located on or adjacent the first guide collar.

The foundation of the windmill construction can comprise a storage- and assembly room for unassembled tower segments.

The jack-up assembly is arranged to elevate assembled tower segments in a vertical direction to a height corresponding to one tower segment, allowing assembly of a new tower segment to a previously assembled and elevated tower segment.

The foundation can comprise a downward directed conical support as a bearing point against a bearing structure.

The foundation may also be supported on an elastic bearing structure.

The foundation can in one embodiment comprises a crane.

According to a second aspect of the invention, a method for assembly of a windmill construction is provided, said windmill construction comprises, when assembled, a rotor-nacelle assembly with blades, a tower, a substructure and a foundation, the method comprising the steps:
  assembling the substructure with a first guide collar and a second guide collar for support of the tower,
  building the tower by assembling modular tower segments using a jack-up assembly, said jack-up assembly elevates assembled tower segments in a vertical direction through said first and second guide collars.

Alternative embodiments are disclosed in the dependent method claims.

The method comprises stepwise building of the tower by elevating assembled tower segments in the vertical direction to a height corresponding to one tower segment, allowing assembly of a new tower segment to a previously assembled and elevated tower segment.

The method may further comprise the steps of mounting the rotor-nacelle assembly and blades on top of a first part of the tower extending above the substructure, and to assemble and elevate tower segments carrying the first part of the tower with the rotor-nacelle assembly and blades to a desired height.

The method may comprise the steps of assembling tower segments to construct said first part of the tower.

The method may comprise the step of inserting said first part of the tower in the substructure.

The method may comprise the step of assembling on site the substructure on the foundation using a crane mounted on the foundation.

The method may comprise the step of assembling the substructure as a lattice structure on the foundation.

The method may comprise the steps of transporting the windmill construction to an offshore platform, wherein the rotor-nacelle assembly and blades are preinstalled on top of a first part of the tower extending above the substructure, and to assemble and elevate tower segments carrying the first part of the tower with the rotor-nacelle assembly and blades to a desired height.

The method may comprise the step of connecting guy lines to the tower.

The method may also comprise the steps of connecting guy lines to one or more tower segments after the assembled tower segments are elevated in the vertical direction through and above said second guide collar, and to adjust tensioning of the guy lines during elevating of the tower.

DESCRIPTION OF THE FIGURES

Embodiments of the present invention will now be described, by way of example only, with reference to the following figures, wherein.

Figure 1:
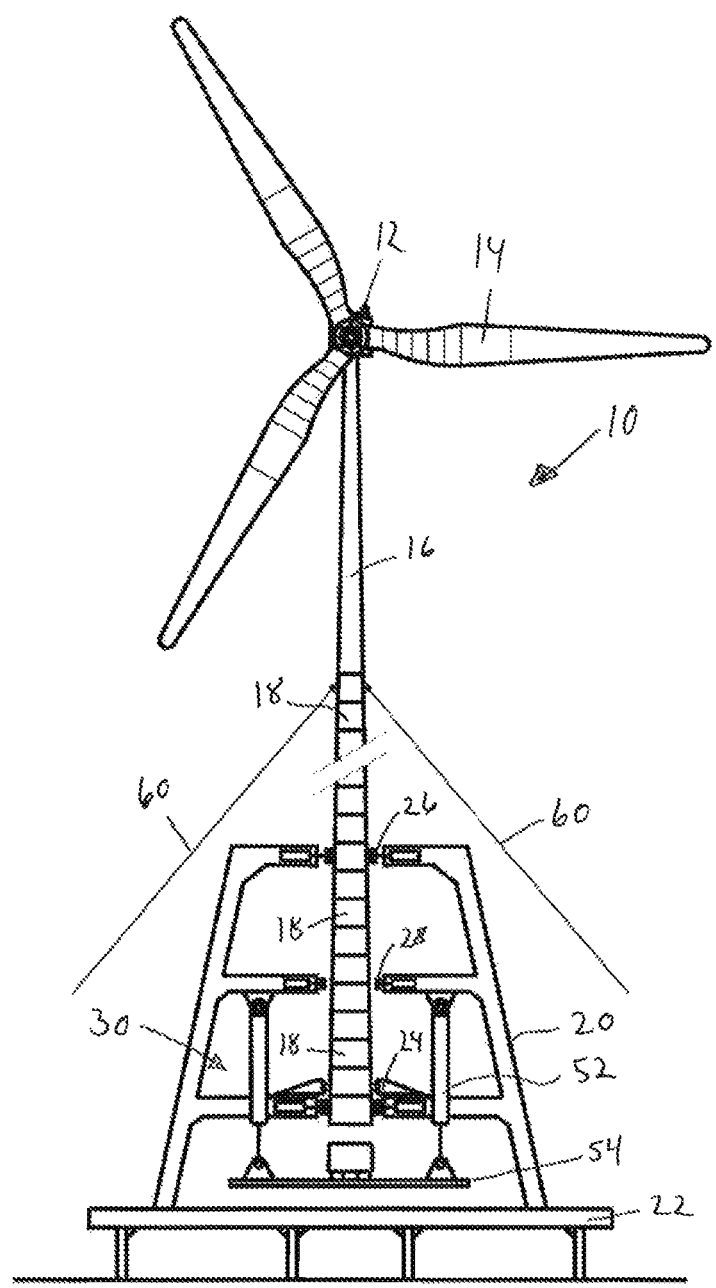
FIG. 1 shows a first embodiment of a windmill construction according to the invention.

DESCRIPTION OF PREFERRED
EMBODIMENTS OF THE INVENTION

The present invention is related to a windmill construction, such as a windmill construction 10 comprising a rotor-nacelle assembly 12 (RNA) with blades 14, and a vertical tower 16 supported by a substructure 20 and a foundation 22. The substructure 20 and the foundation 22 can be integrated with each other, and thus be viewed as one structure. The substructure 20 is preferably a lattice structure, as clearly shown in particularly FIG. 3. The foundation 22 can also be a lattice structure, or a more traditional support structure. The windmill construction 10 is a jacked windmill construction, and may also be called a self-elevating windmill construction.

Figure 2:
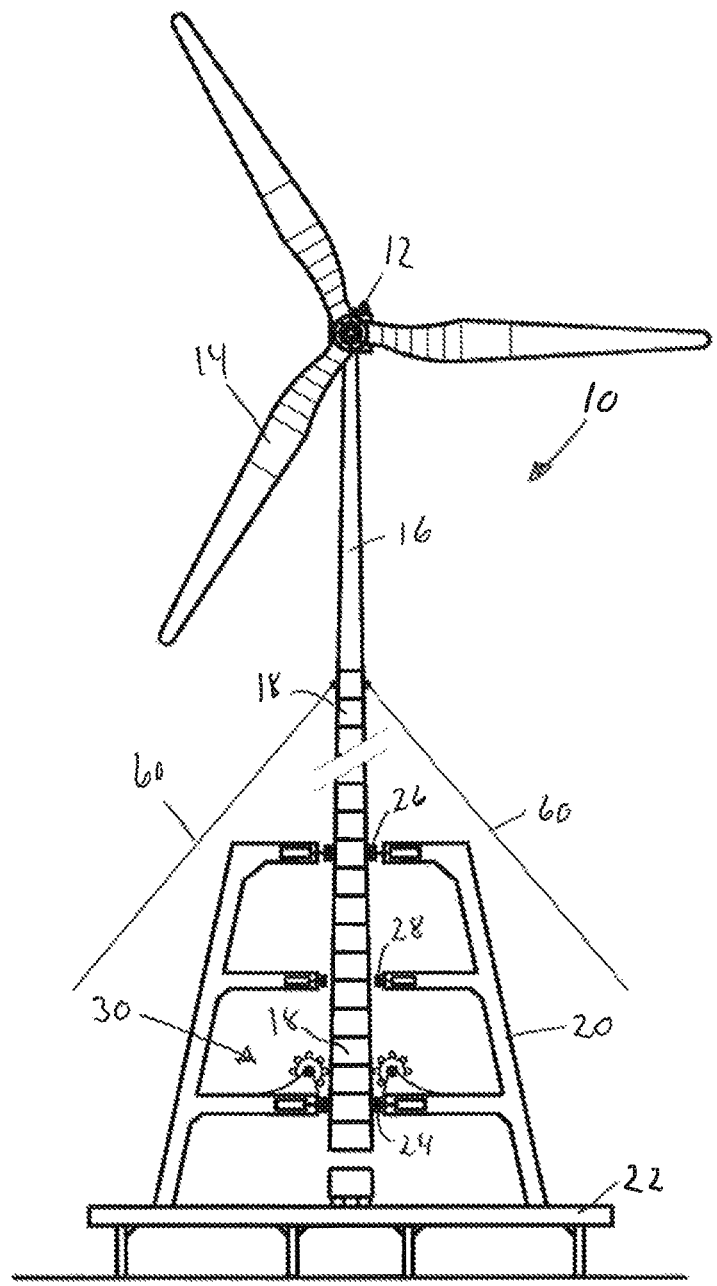
FIG. 2 shows a second embodiment of a windmill construction according to the invention.

The substructure 20 comprises a first guide collar 24 and a second guide collar 26 for support of the tower 16, as seen particularly in FIGS. 1 and 2. The first guide collar 24 is located in a lower part of the substructure 20 and the second guide collar 26 is located in an upper part of the substructure 20, such that the first and second guide collars 24,26 supports the tower 16 during erection and after the tower 16 is erected. The substructure 20 must therefore be a support structure erected to a sufficient height for the first and second guide collars 24,26 to be spaced apart a vertical distance enough to provide lateral support to the tower 16. As shown in FIGS. 1-4 the substructure 20 can be a support structure of pyramid shape and that has at least upper and lower supporting guide collars 24,26 taking up lateral forces.

The substructure 20 further comprises a jack-up assembly 30 for receipt of modular tower segments 18, providing what can be called "a stepwise tower building block concept". The tower segments 18 are assembled in the substructure 20 and erectable by the jack-up assembly 30 to produce an assembled tower 16. The jack-up assembly 30 is preferably provided in a lower part of the substructure, for instance on or at the first guide collar 24.

The first guide collar 24 and the second guide collar 26 comprises each an aperture allowing through going axial movement of the tower 16 or the tower segments 18, said apertures, which may be being closable and openable. The first guide collar 24 and the second guide collar 26 can also comprise elastic dampers, such as elastic rubber parts, that can absorb vibration from the tower 16 and thus reduce background noise The foundation 22 may also be supported on an elastic bearing structure 64, for instance as seen in FIGS. 11-15, to further provide noise reduction.

The substructure 20 of the windmill construction 10 can further comprise a third guide collar 28 located between the first guide collar 24 and the second guide collar 26, wherein the third guide collar 28 similar has a closable and openable aperture allowing through going axial movement of the tower 16 or the tower segments 18. The third guide collar 28 may optionally comprise an elastic damper, such as elastic rubber parts, for reduction of background noise.

The first guide collar 24, the second guide collar 26 and possibly the third guide collar 28 may be a circular collar having an internal aperture. In one embodiment, the aperture can be closable by using wedges in the aperture between the collar and the tower 16 or the tower segments 18, and openable by removing the wedges. In a second embodiment, the circular collar can be made up of two semi-circular parts, each being connected to a pressure cylinder pushing or retracting the semi-circular parts to and from each other. The aperture is thus closable by pushing the semi-circular parts towards each other to clamp the tower 16 or the tower segments 18 in between them, and openable by retracting the semi-circular parts.

The jack-up assembly 30 can be basically any known hoisting or lifting mechanism capable of elevating the tower 16 and the tower segments 18 during assembly, and to elevate assembled tower segments 18 in a vertical direction at least to a height corresponding to one tower segment 18, allowing assembly of a new tower segment 18 to a previously assembled and elevated tower segment 18.

FIG. 1 shows a jack-up assembly 30 comprising a winch system 52 connected to a support platform 54. The winch system 52) is activatable to force the platform 54 and the tower segments 18 upwards during assembly of the tower 16. The jack-up assembly 30 comprises gripping members gripping and holding the lower tower segments 18 prior to being elevated and during assembly of a next tower segment 18 to a previously assembled and elevated tower segment 18.

FIG. 2 shows another example of a jack-up assembly 30 with gripping elements gripping and holding the lower tower segments 18 prior to being elevated and during assembly of a next tower segment 18 to a previously assembled and elevated tower segment 18.

Figure 8:
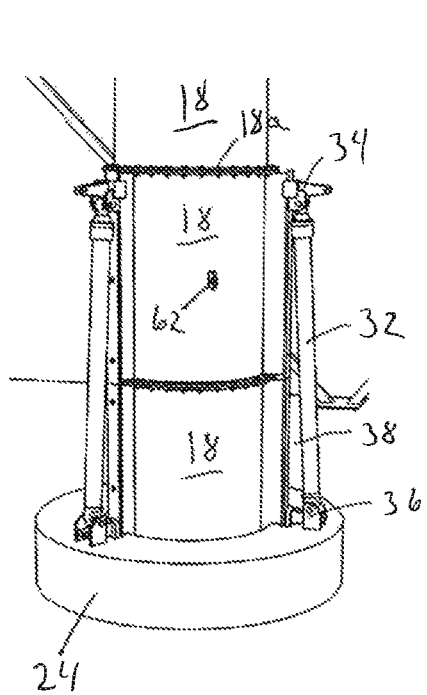
FIGS. 8 and 9 shows an example of a jack-up assembly used in the windmill construction according to the invention.
Figure 9:
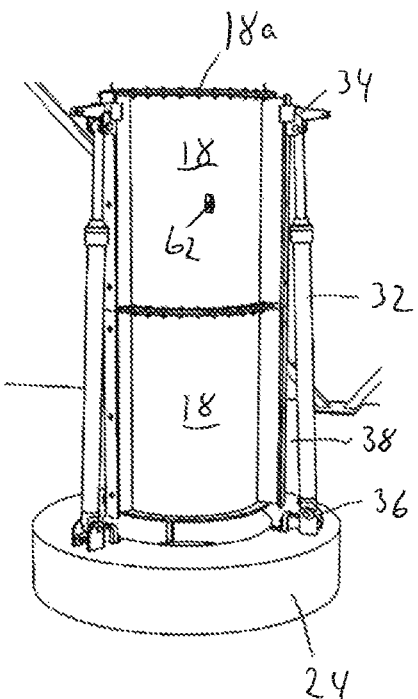

FIGS. 8 and 9 show the jack-up assembly 30 as hydraulic pressure cylinders 32 attachable to the tower segment 18. The hydraulic pressure cylinders 32 comprise for instance lower and upper claws 34,36 for gripping and locking onto T shaped vertical guide rails 38 on the tower segment 18. The hydraulic pressure cylinders 32 are similar activatable to force the tower segments 18 upwards during assembly of the tower 16, and to grip and hold the lower tower segments 18 prior to being elevated and during assembly of a next tower segment 18 to a previously assembled and elevated tower segment 18.

FIG. 9 shows a further example of the jack-up assembly 30, comprising a rack and pinion system 40,42. The rack and pinion system 40,42 is activatable to force the tower segments 18 upwards during assembly of the tower 16, and to grip and hold the lower tower segments 18 prior to being elevated and during assembly of a next tower segment 18 to a previously assembled and elevated tower segment 18.

Figure 10:
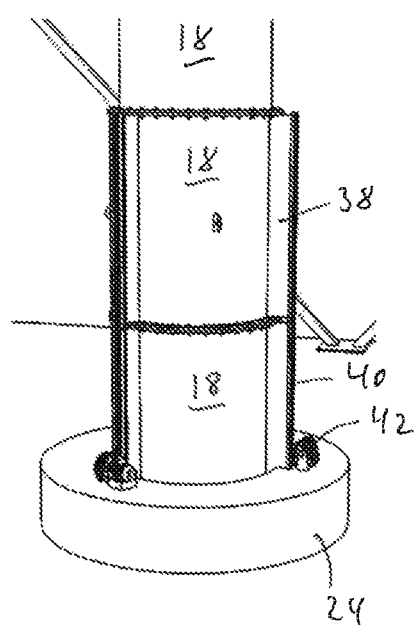
FIG. 10 shows a further example of a jack-up assembly used in the windmill construction according to the invention.

FIG. 8-10 further illustrates that each tower segment 18 can be a tubular pipe section or lattice section of circular and cylindrical shape, for instance equipped with vertical guide rails 38 for connection to the jack-up assembly 30. Each tower segment 18 comprises flanges 18a for attachment to other tower segments 18.

The tower 16 may however also be built as a lattice structure with three to four vertical corners, for instance with a similar shape as a traditional jack-ups, which often is triangular, or the tower can be built with a similar shape as traditional tower crane, which often is square. Hence, the tower segments 18 may be of a multisided lattice structure, for instance with three or four sides.

Figure 5:
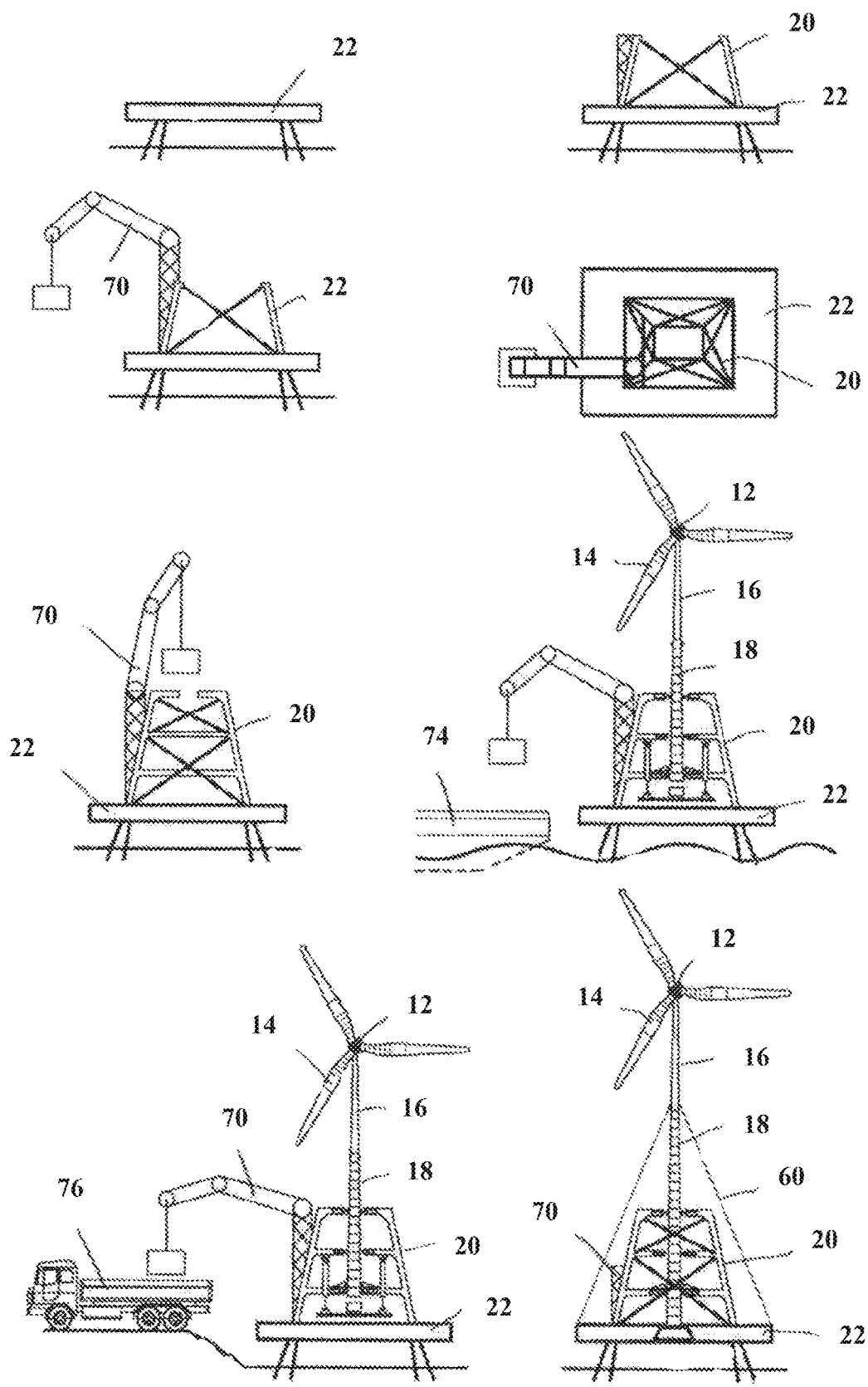
FIG. 5 illustrates sequentially building of a windmill construction according to the invention.
Figure 6:
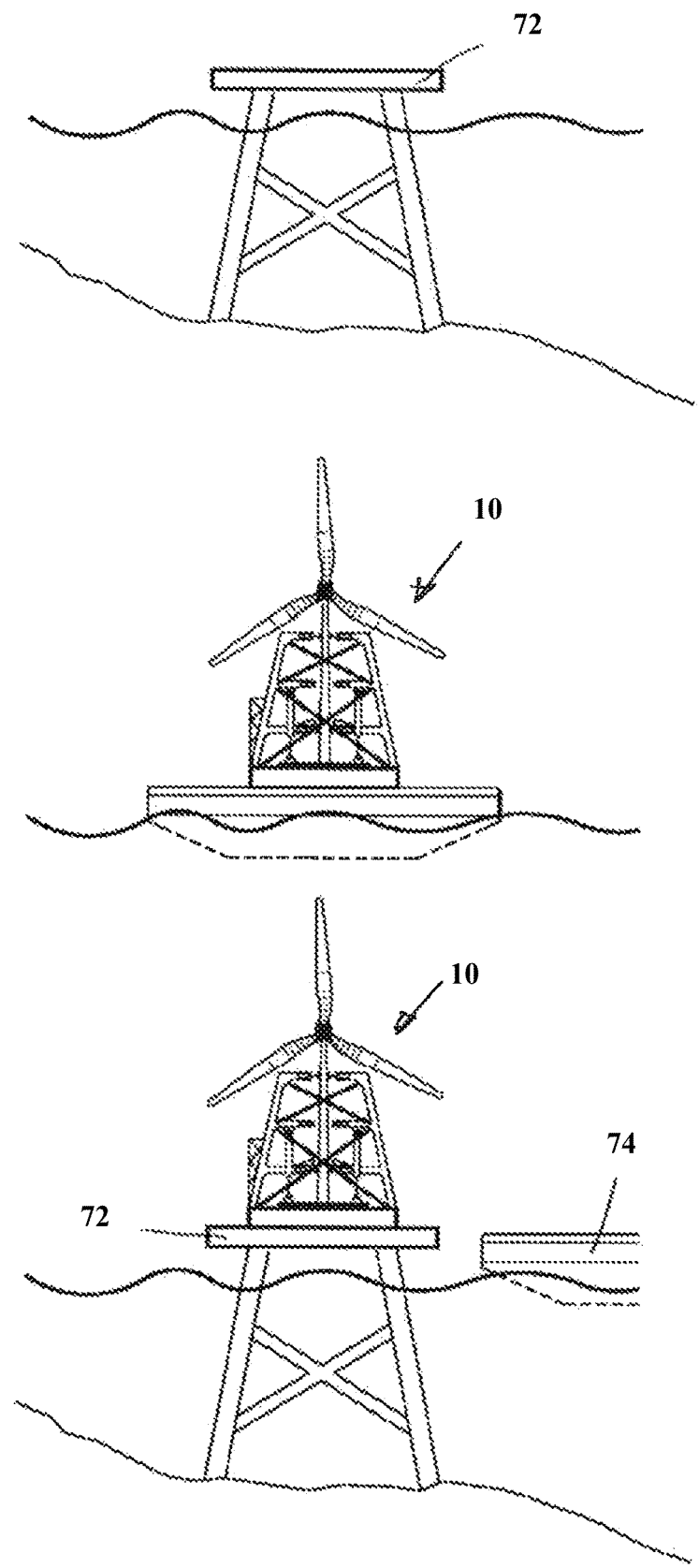
FIG. 6 illustrates building of a windmill construction according to the invention on an offshore platform.
Figure 7:
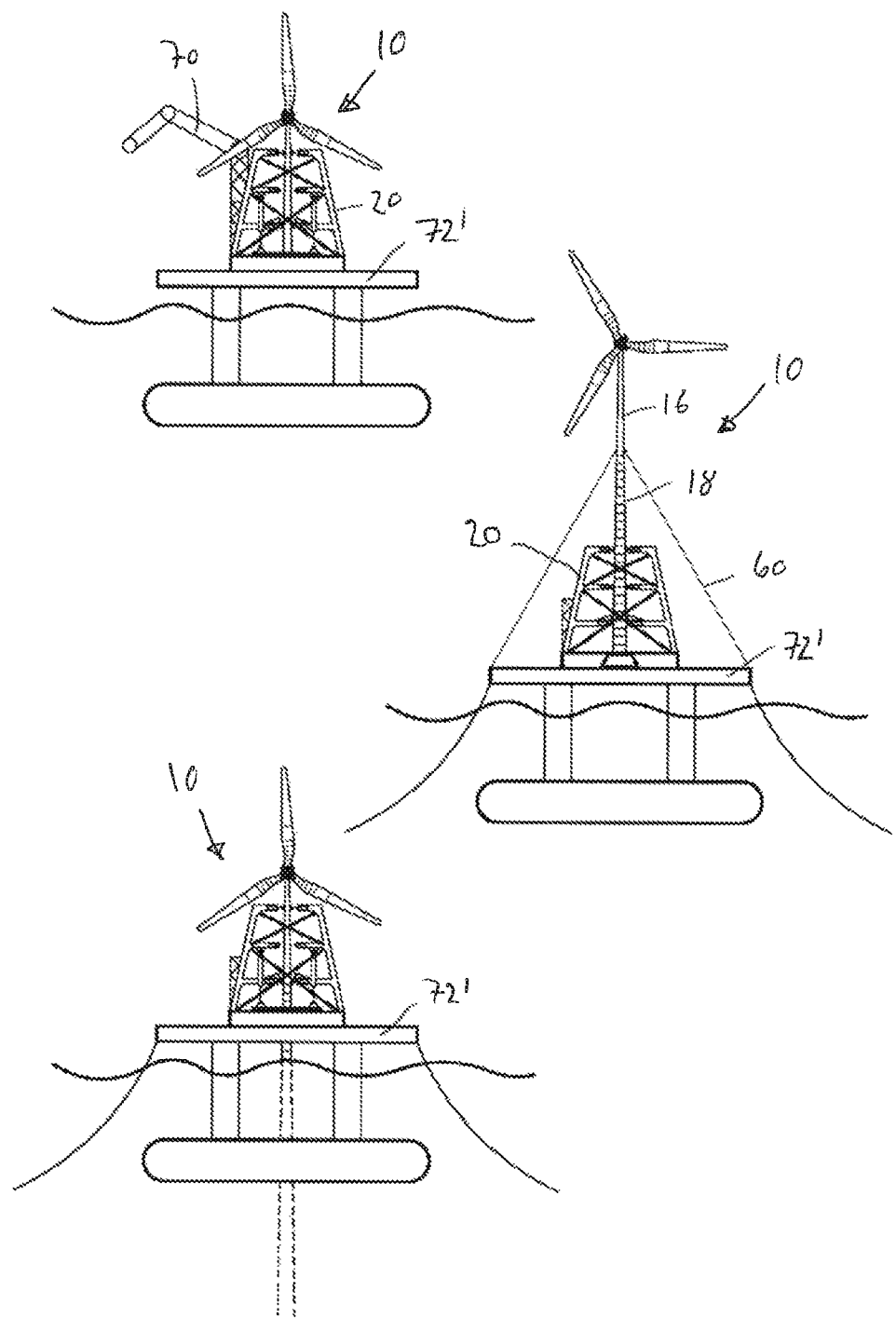
FIG. 7 illustrates a windmill construction according to the invention on a floating offshore platform.

The windmill construction 10 according to the invention can be placed onshore or offshore, as illustrated in FIG. 5. FIG. 6 illustrates building the windmill construction 10 on an offshore platform 72 with legs, and FIG. 7 illustrates the windmill construction 10 on a floating offshore platform 72'. A semi assembled windmill construction 10 according to the invention can be shipped to the offshore platform 72,72' by a barge 74, or the windmill construction can be fully assembled on the offshore platform 72,72'.

Figure 4:
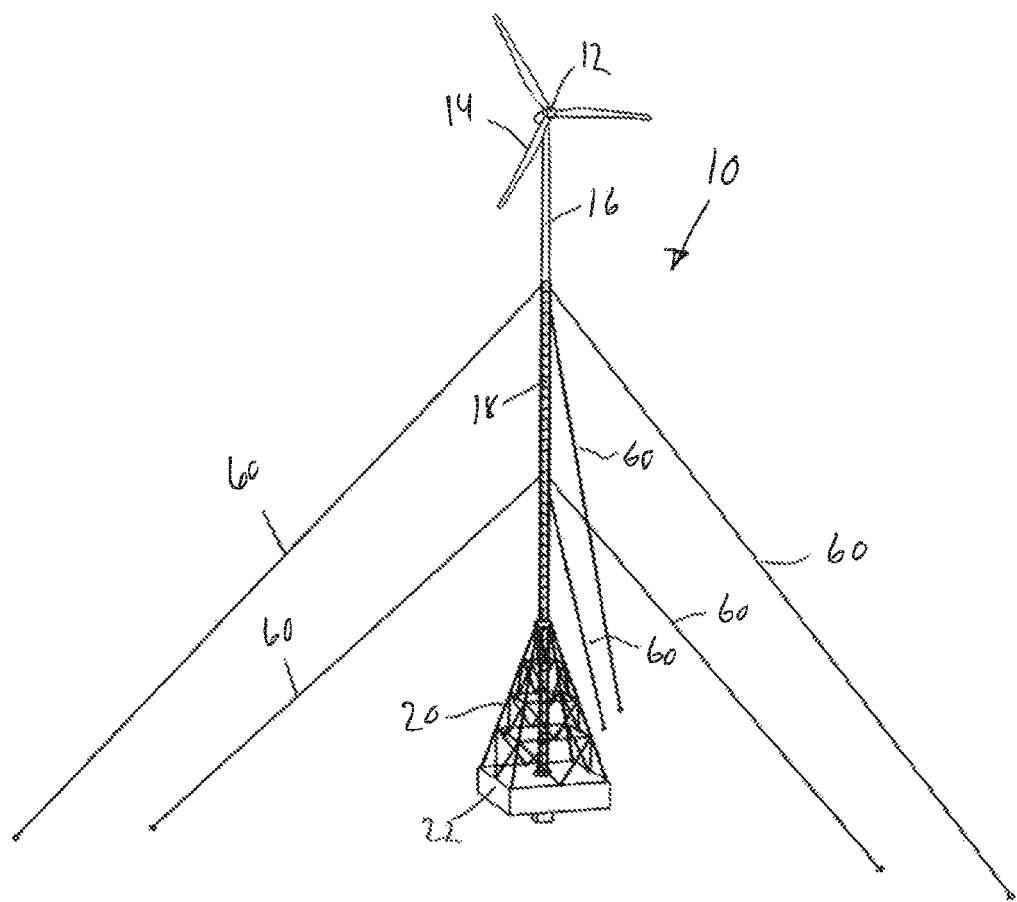
FIG. 4 illustrates a very tall windmill construction according to the invention.

FIG. 4 illustrates a very tall windmill construction 10 according to the invention, for instance taller than 250 m. Such a height will improve noise influence and may also reduce bird collisions. To stabilize the tower 16, the tower 16 and/or the tower segments 18 can comprises attachment lugs 62 for guy lines 60 running down to the foundation 22 or to anchor points on the ground or on the seabed.

The windmill construction 10 can comprise a crane 70, for instance on the foundation 22 as seen in FIGS. 5-7, thus rendering use of mobile cranes superfluous. The crane 70 can assist in building the substructure 20 of the windmill construction 10, as seen from top left in FIG. 5, and possibly also to mounting the rotor-nacelle assembly 12 with blades 14 on the tower 16 prior to starting to assemble the tower segments 18. The crane 70 can receive parts from a barge 74 in case of building offshore or from a truck 76 in case of building onshore.

FIGS. 11 to 15 illustrates assembly and jack-up of modular tower segments in the windmill construction according to the invention.

Figure 11:
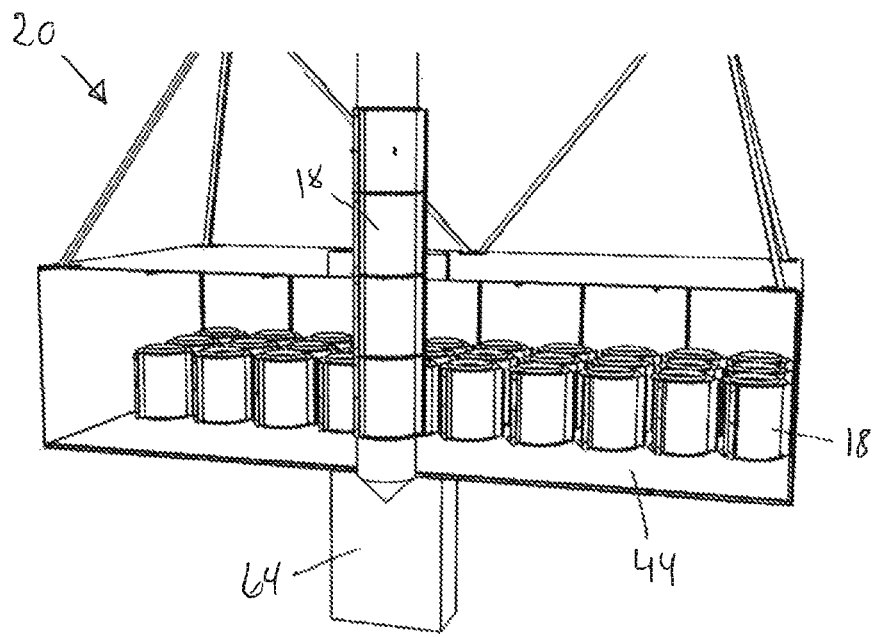
FIGS. 11 to 15 illustrates assembly and jack-up of tower segments in the windmill construction according to the invention.

As seen in FIG. 11, the lower part of the substructure 20 or the foundation 22 can comprise a storage and assembly room 44 for storage of tower segments 18 and for assembly of tower segments 18.

After assembling the substructure 20 with the first guide collar 24 and the second guide collar 26, the tower 16 is built by assembling the modular tower segments 18 using the jack-up assembly 30, wherein said jack-up assembly 30 elevates assembled tower segments 18 in a vertical direction through said first and second guide collars 24,26.

The tower 16 can in one embodiment be built entirely of modular tower segments 18. When the first tower segments 18 are erected and guided through the second guide collar 26, the rotor-nacelle assembly 12 and blades 14 are mounted on top of the uppermost tower segment 18, and assembling and elevating of subsequent tower segments 18 commences to build the complete tower 16.

In another embodiment, a first part of the tower 16, being a conventional tower part, carrying the rotor-nacelle assembly 12 and blades 14 can be mounted on top of the uppermost tower segment 18 that has been erected above the second guide collar 26.

Figure 3:
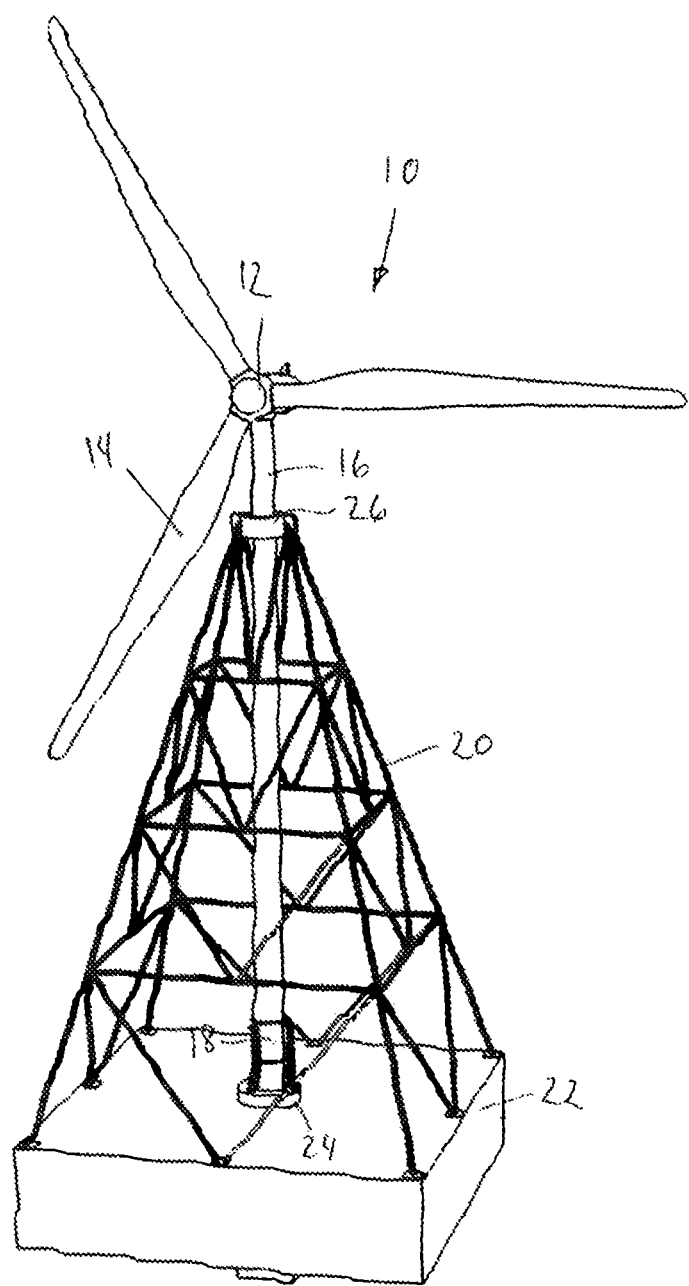
FIG. 3 shows a third embodiment of a windmill construction according to the invention.

In a further embodiment, the first part of the tower 16, being a conventional tower part, carrying the rotor-nacelle assembly 12 and blades 14 is inserted in the substructure 20, for instance as seen in FIG. 3, and landed on a tower segment 18 erected above the first guide collar 24 in the lower part of the substructure 20. Assembling and elevating of subsequent tower segments 18 commences thereafter to build the complete tower 16.

When the windmill construction shall be placed offshore, the windmill construction 10 can be transported to the offshore platform 72,72' with the rotor-nacelle assembly 12 and blades 14 preinstalled on top of the first part of the tower 16 extending above the substructure 20, and thereafter to assemble and elevate tower segments 18 carrying the first part of the tower 16 with the rotor-nacelle assembly 12 and blades 14 to a desired height.

Figure 12:
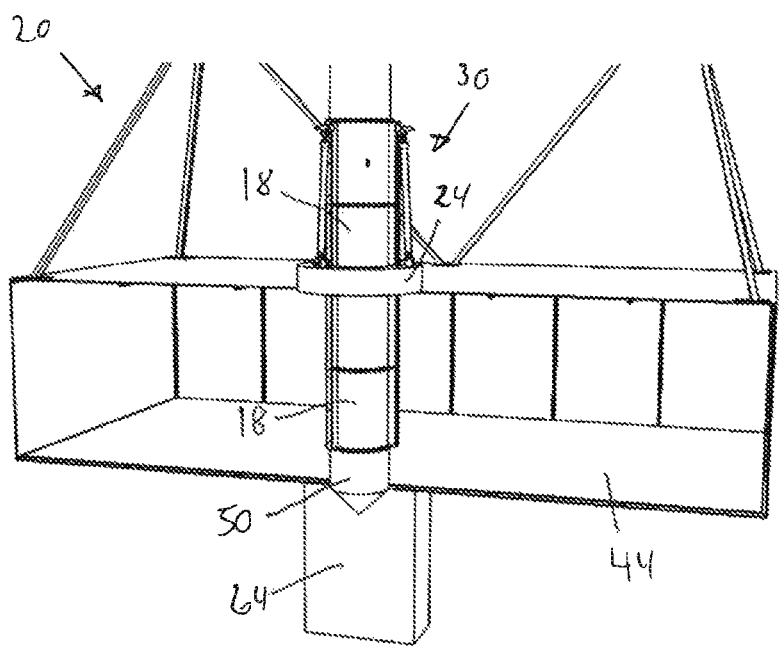
Figure 13:
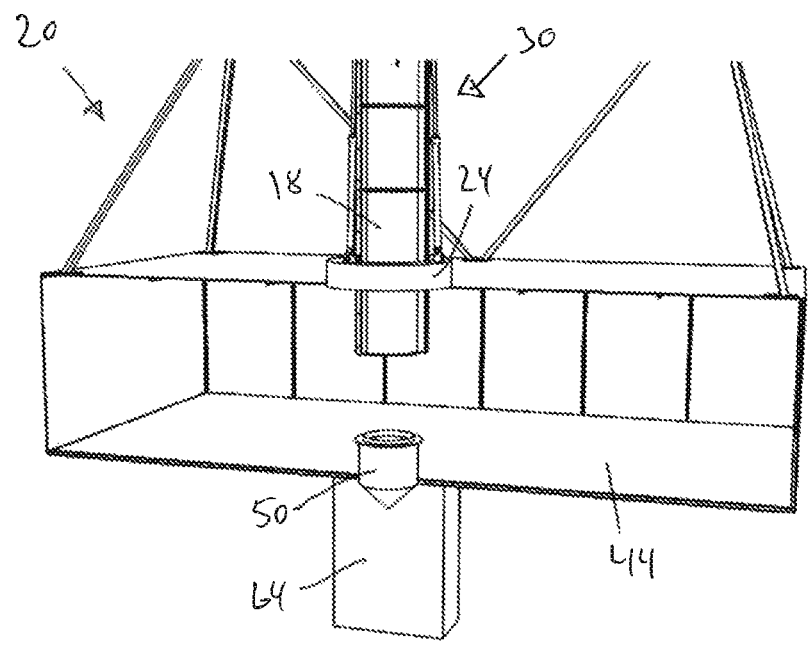
Figure 14:
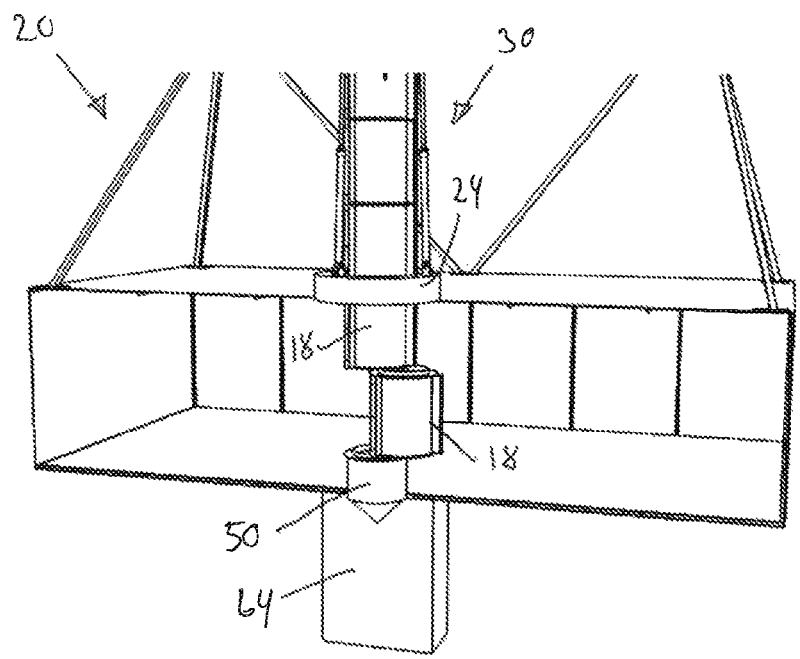
Figure 15:
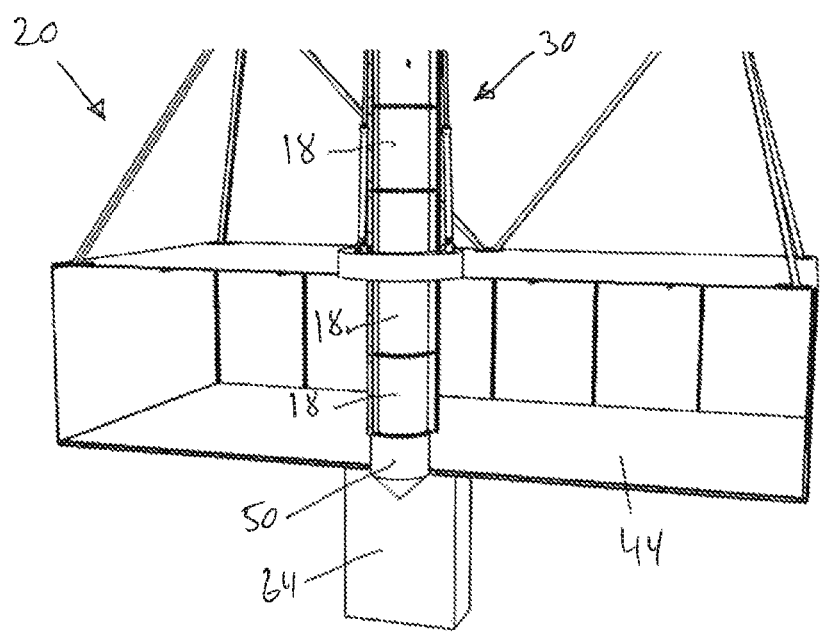

FIG. 12-14 illustrates stepwise building of the tower 16. In FIG. 12 the jack-up assembly 30 starts lifting previous build tower segments. In FIG. 13, the previous assembled tower segments 18 have been elevated in the vertical direction to a height corresponding to one tower segment 18, thus allowing assembly of a new tower segment 18 to a previously assembled and elevated tower segment 18, as seen in FIGS. 14 and 15. The jack-up assembly 30 can then repeat the process until desired tower 16 is reached.

Guy lines 60, as seen particularly in FIG. 4, may improve buckling length of the tower and could possibly also reduce the total weight of the tower structure. The guy lines 60 are during assembly connected to one or more tower segments 18 after the assembled tower segments 18 have been elevated in the vertical direction through and above said second guide collar 26. During elevating of the tower 16 and tower segments 18, the tensioning of the guy lines 60 are adjusting. To tension the guy lines 60, a constant tension winch placed on the ground or placed on the foundation can be used. After final height has been reached, the guy lines are final tensioned and permanently anchored on the ground. The winch can then be removed and be used on the next windmill construction.

Offshore it can be possible to use lump weights connected to the end of the guy lines, and which are lifted up from the ocean floor during elevating of the tower 16 and tower segments 18.

The guy lines 60 can for instance be wires, tubulars, synthetic fiber cables or similar that can be tensioned.

The invention claimed is:

1. A windmill construction (10), comprising:
a rotor-nacelle assembly (12) with blades (14),
a tower (16),
a substructure (20), and
a foundation (22),
the substructure (20) and the foundation (22) being integrated with each other, wherein the substructure (20) comprises a first guide collar (24) and a second guide collar (26) for support of the tower (16), said first guide collar (24) being located in a lower part of the substructure (20) and said second guide collar (26) being located in an upper part of the substructure (20), and
the substructure (20) comprises a jack-up assembly (30) for receipt of modular tower segments (18), said tower segments (18) are arranged to be assembled in the substructure (20) and are erectable by the jack-up assembly (30) to produce an assembled tower (16); wherein the tower segments (18) are tubular section each equipped with vertical guide rails (38) for connection to the jack-up assembly (30).

2. The windmill construction (10) according to claim 1, wherein the first guide collar (24) and the second guide collar (26) each has an aperture allowing through going axial movement of the tower segments (18).

3. The windmill construction (10) according to claim 1, wherein the first guide collar (24) and the second guide collar (26) are closable and openable.

4. The windmill construction (10) according to claim 1, wherein the first guide collar (24) and the second guide collar (26) comprises elastic dampers.

5. The windmill construction (10) according to claim 1, wherein the substructure (20) comprises a third guide collar (28) located between the first guide collar (24) and the second guide collar (26), wherein the third guide collar (28) has a closable and openable aperture allowing through going axial movement of the tower segments (18).

6. The windmill construction (10) according to claim 1, wherein a third guide collar (28) comprises an elastic damper.

7. The windmill construction (10) according to claim 1, wherein the substructure (20) is a lattice structure.

8. The windmill construction (10) according to claim 1, wherein each tower segment (18) is a tubular pipe section or a lattice section.

9. The windmill construction (10) according to claim 1, wherein each tower segment (18) comprises flanges (18a) for attachment to abutting tower segments (18).

10. The windmill construction (10) according to claim 1, wherein the jack-up assembly (30) comprises hydraulic pressure cylinders (32) attachable to each tower segment (18), said hydraulic pressure cylinders (32) comprise lower and upper claws (34,36) for gripping and locking onto vertical guide rails (38) on the tower segment (18), wherein the vertical guide rails are T-shaped, and wherein the hydraulic pressure cylinders (32) are activatable to force the tower segments (18) upwards during assembly of the tower (16).

11. The windmill construction (10) according to claim 1, wherein the jack-up assembly (30) comprises a rack and pinion system (40,42), said rack and pinion system (40,42) being activatable to force the tower segments (18) upwards during assembly of the tower (16).

12. The windmill construction (10) according to claim 1, wherein the jack-up assembly (30) comprises a winch system (52) connected to a support platform (54), said winch system (52) being activatable to force the support platform (54) and the tower segments (18) upwards during assembly of the tower (16).

13. The windmill construction (10) according to claim 1, wherein the tower (16) and/or the tower segments (18) comprises attachment lugs (62) for guy lines (60).

14. The windmill construction (10) according to claim 1, wherein the jack-up assembly (30) is located on or adjacent the first guide collar (24).

15. The windmill construction (10) according to claim 1, wherein the foundation (22) comprises a storage- and assembly room (44) for unassembled tower segments (18).

16. The windmill construction (10) according to claim 1, wherein the jack-up assembly (30) is arranged to elevate assembled tower segments (18) in a vertical direction to a height corresponding to one tower segment (18), allowing assembly of a new tower segment (18) to a previously assembled and elevated tower segment (18).

17. The windmill construction (10) according to claim 1, wherein the foundation (22) comprises a downward directed conical support (50) as a bearing point against a bearing structure (64).

18. The windmill construction (10) according to claim 1, wherein the foundation (22) is supported on an elastic bearing structure (64).

19. The windmill construction (10) according to claim 1, wherein the foundation (22) comprises a crane (70).

20. A method for assembly of the windmill construction (10) according to claim 1, the method comprising the steps:
    assembling the substructure (20) with the first guide collar (24) and the second guide collar (26) for support of the tower (16),
    building the tower (16) by assembling tower segments (18) using the jack-up assembly (30), said jack-up assembly (30) elevates assembled tower segments (18) in a vertical direction through said first and second guide collars (24,26), and
    transporting the windmill construction (10) to an offshore platform (72,72'), wherein the rotor-nacelle assembly (12) and blades (14) are preinstalled on top of a first part of the tower (16) extending above the substructure (20), and to assemble and elevate tower segments (18) carrying the first part of the tower (16) with the rotor-nacelle assembly (12) and blades (14) to a desired height.

21. The method according to claim 20, comprising stepwise building of the tower (16) by elevating assembled tower segments (18) in the vertical direction to a height corresponding to one tower segment (18), allowing assembly of a new tower segment (18) to a previously assembled and elevated tower segment (18).

22. The method according to claim 20, comprising the steps of mounting the rotornacelle assembly (12) and blades (14) on top of the first part of the tower (16) extending above the substructure (20), and to assemble and elevate tower segments (18) carrying the first part of the tower (16) with the rotor-nacelle assembly (12) and blades (14) to a desired height.

23. The method according to claim 22, comprising the steps of assembling tower segments (18) to construct said first part of the tower (16).

24. The method according to claim 22, comprising the step of inserting said first part of the tower (16) in the substructure (20).

25. The method according to claim 20, comprising the step of assembling on site the substructure (20) on the foundation (22) using a crane (70) mounted on the foundation (22).

26. The method according to claim 20, comprising the step of assembling the substructure (20) as a lattice structure on the foundation (22).

27. The method according to claim 20, comprising the step of connecting guy lines (60) to the tower (16).

28. The method according to claim 20, comprising the steps of
    connecting guy lines (60) to one or more tower segments (18) after the assembled tower segments (18) have been elevated in the vertical direction through and above said second guide collar (26), and
    adjusting tensioning of the guy lines (60) during elevating of the tower (16).

* * * * *